(12) United States Patent
Sakamoto et al.

(10) Patent No.: US 11,086,419 B2
(45) Date of Patent: Aug. 10, 2021

(54) INFORMATION PROCESSING DEVICE, INFORMATION PROCESSING METHOD, AND RECORDING MEDIUM

(71) Applicant: SHARP KABUSHIKI KAISHA, Sakai (JP)

(72) Inventors: Kiho Sakamoto, Sakai (JP); Kenji Akitomo, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 15/931,202

(22) Filed: May 13, 2020

(65) Prior Publication Data

US 2020/0371607 A1 Nov. 26, 2020

(30) Foreign Application Priority Data

May 22, 2019 (JP) .............................. JP2019-095907

(51) Int. Cl.
*G06F 3/038* (2013.01)
*G06F 3/041* (2006.01)

(52) U.S. Cl.
CPC ........ *G06F 3/0383* (2013.01); *G06F 3/04162* (2019.05); *G06F 2203/0382* (2013.01)

(58) Field of Classification Search
CPC ... G06F 2203/0382; G06F 2203/04114; G06F 2203/04807; G06F 3/03545; G06F 3/033; G06F 3/0383; G06F 3/0441; G06F 3/0442; G06F 3/04162; G06F 3/04817; G06F 3/04886
See application file for complete search history.

(56) References Cited

U.S. PATENT DOCUMENTS

| 10,698,524 | B2* | 6/2020 | Park | G06F 3/0442 |
| 2015/0058718 | A1* | 2/2015 | Kim | G06F 3/03545 |
| | | | | 715/268 |
| 2015/0199036 | A1* | 7/2015 | Akitomo | G06F 3/0412 |
| | | | | 345/173 |
| 2015/0363035 | A1* | 12/2015 | Hinckley | G06F 3/04162 |
| | | | | 345/173 |
| 2016/0054851 | A1* | 2/2016 | Kim | G06F 3/03545 |
| | | | | 345/174 |
| 2016/0364091 | A1* | 12/2016 | Bernstein | G06F 3/0416 |
| 2018/0203527 | A1* | 7/2018 | Matsui | G06F 3/0488 |

FOREIGN PATENT DOCUMENTS

JP  2008-118301 A  5/2008

* cited by examiner

*Primary Examiner* — Kenneth Bukowski
(74) *Attorney, Agent, or Firm* — ScienBiziP, P.C.

(57) ABSTRACT

Provided is a display device including an input detector that detects input information input to an input surface by input devices, an input number determiner that determines, based on the input information detected by the input detector, an input number indicating the number of the input devices of which an input operation on the input surface is enabled, and a display processor that displays an attribute setting object in which an attribute of each of the input devices is settable, based on the input number determined by the input number determiner, in a specific region of the input surface.

11 Claims, 18 Drawing Sheets

FIG. 2

PEN INFORMATION (D1)

| PEN IDENTIFIER | PEN ID | PEN NAME |
|---|---|---|
| p1111 | 001 | A |
| p2222 | 002 | B |
| p3333 | 003 | C |
| p4444 | 004 | D |

FIG. 3

ATTRIBUTE INFORMATION (D2)

| ATTRIBUTE | SETTING INFORMATION |
|---|---|
| COLOR | BLACK (BK), BLUE (BL), RED (RD), GREEN (GN), YELLOW (YL), WHITE (WT) |
| TYPE | PEN, MARKER, ERASER, AREA SELECTION |
| THICKNESS | EXTRA FINE, FINE, NORMAL, THICK, EXTRA THICK |

FIG. 4

DETECTION INFORMATION (D3)

| PEN ID | ATTRIBUTE |
|---|---|
| 001 | RED (RD), PEN, EXTRA FINE |
| 002 | YELLOW (YL), MARKER, THICK |
| | |
| | |

INFORMATION PROCESSING DEVICE, INFORMATION PROCESSING METHOD, AND RECORDING MEDIUM

INCORPORATION BY REFERENCE

This application is based upon and claims the benefit of priority from the corresponding Japanese Patent Application No. 2019-095907 filed on May 22, 2019, the entire contents of which are incorporated herein by reference.

BACKGROUND OF THE INVENTION

Field of the Invention

The present disclosure relates to an information processing device in which it is possible to draw (input) drawing information on a display with a touch pen, and also relates to an information processing method and an information processing program.

Description of the Background Art

Conventionally, an electronic board (also referred to as an electronic blackboard or an electronic whiteboard) is known as one of display devices in which a touch panel is used to accept an instruction input (touch) from a user. Further, in the electronic board, a system is proposed in which a plurality of users can simultaneously input information into the electronic board by using input devices such as electronic pens (touch pens). In this system, a plurality of menu images are displayed on a display to correspond to each of the plurality of electronic pens, and each of the users can operate the menu images corresponding to the electronic pen used by the user to apply various settings.

In the conventional technology, a plurality of identical menu images are displayed in an arbitrary region of the display in accordance with the number of electronic pens, and thus, there is a problem that a drawing region in the display is narrow as the number of electronic pens increases.

SUMMARY OF THE INVENTION

An object of the present disclosure is to provide an information processing device in which an input operation is performed on a display by using a plurality of input devices without narrowing a drawing region of the display, and also to provide an information processing method therefor and an information processing program therefor.

An information processing device according to an aspect of the present disclosure includes: a processor; and a memory storing a program that causes the processor to execute control of the information processing device to function as an input detector that detects input information input to an input surface by input devices, an input number determiner that determines, based on the input information detected by the input detector, an input number indicating the number of the input devices of which an input operation on the input surface is enabled, and a display processor that displays an attribute setting object in which an attribute of each of the input devices is settable, based on the input number determined by the input number determiner, in a specific region of the input surface.

An information processing method according to another aspect of the present disclosure includes using one or more processors to execute: an input detection process for detecting input information input to an input surface by input devices: an input number determination process for determining, based on the input information detected in the input detection process, an input number indicating the number of the input devices of which an input operation on the input surface is enabled; and a display process for displaying an attribute setting object in which an attribute of each of the input devices is settable, based on the input number determined in the input number determination process, in a specific region of the input surface.

In a non-transitory recording medium for storing an information processing program according to another mode of the present disclosure, the program causes one or more processors to execute: an input detection process for detecting input information input to an input surface by input devices; an input number determination process for determining, based on the input information detected in the input detection process, an input number indicating the number of the input devices of which an input operation on the input surface is enabled; and a display process for displaying an attribute setting object in which an attribute of each of the input devices is settable, based on the input number determined in the input number determination process, in a specific region of the input surface.

According to the present disclosure, it is possible to provide an information processing device in which an input operation is performed on the display by using a plurality of input devices without narrowing a drawing region of the display, and also to provide an information processing method, and an information processing program.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 2 is a diagram illustrating an example of pen information used in the display device according to the embodiment of the present disclosure;

FIG. 3 is a diagram illustrating an example of attribute information used in the display device according to the embodiment of the present disclosure;

FIG. 4 is a diagram illustrating an example of detection information used in the display device according to the embodiment of the present disclosure;

DESCRIPTION OF THE PREFERRED EMBODIMENTS

An embodiment of the present disclosure will be described below with reference to the attached drawings. The following embodiment is an example in which the present disclosure is embodied, and does not intend to limit the technical scope of the present disclosure.

Figure 1:
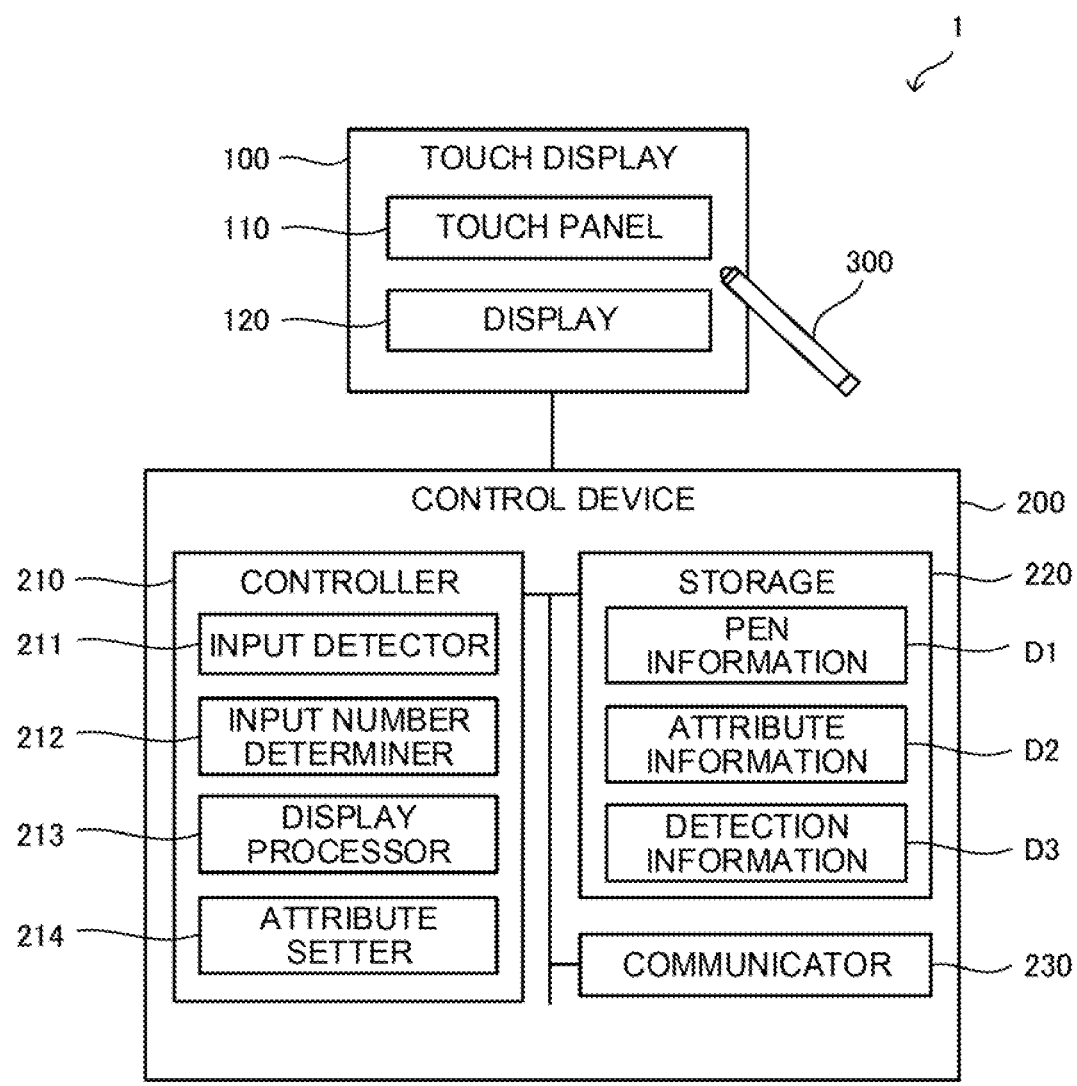
FIG. 1 is a block diagram illustrating a configuration of a display device according to an embodiment of the present disclosure.

As illustrated in FIG. 1, a display device 1 according to the embodiment of the present disclosure includes a touch display 100, a control device 200, and a touch pen 300. The control device 200 is a computer that is connected to the touch display 100 and that controls the touch display 100. The control device 200 and the touch display 100 may be formed as one body, may be connected via a network (wireless communication or wired communication), or may be connected by wire (cable). The touch pen 300 is connected to the control device 200 via a network (wireless communication or wired communication). The display device 1 is an example of an information processing device according to the present disclosure. The information processing device according to the present disclosure may be configured as a device without the touch display 100, that is, may be configured by the control device 200 alone.

The touch display 100 includes a touch panel 110 and a display 120. The touch panel 110 may be a capacitive touch panel, or may be a pressure sensitive or an infrared ray touch panel. That is, the touch panel 110 may be any device capable of appropriately receiving a user operation input such as a touch. The touch panel 110 is provided in the display 120. The display 120 is, for example, a liquid crystal display. The display 120 is not limited to a liquid crystal display, and may be a light emitting diode (LED) display, an organic electro-luminescence (EL) display, a projector, or the like. The touch display 100, the touch panel 110, and the display 120 are each an example of an input surface according to the present disclosure.

The touch display 100 may be a device such as a computer, a tablet terminal, a smartphone, and a car navigation system, where a touch panel is provided.

The touch pen 300 is a pen used by a user to touch (input into) the touch display 100. The touch pen 300 is an electronic pen capable of communicating with control device 200. The touch pen 300 is an example of an input device according to the present disclosure.

For example, the user uses the touch pen 300 to input information such as a character and a figure by handwriting. In the display device 1, the touch pen 300 includes a plurality of the touch pens 300. In the present embodiment, four touch pens 300 (a touch pen A, a touch pen B, a touch pen C, and a touch pen D) are described as an example. For example, a user A uses the touch pen A to input information to the touch display 100, a user B uses the touch pen B to input information to touch display 100, a user C uses the touch pen C to input information to the touch display 100, and a user D uses the touch pen D to input information to the touch display 100. The users A to D use the touch pens A to D of the users A to D to simultaneously input information to the touch display 100. One user may use a plurality of touch pens 300 at the same time. Each of the touch pens 300 is assigned with unique identification information (pen ID).

As illustrated in FIG. 1, the control device 200 includes a controller 210 and a storage 220.

The storage 220 is a non-volatile storage including a hard disk drive (HDD), a solid state drive (SSD), or a flash memory that store various types of information. The storage 220 stores therein data including pen information D1, attribute information D2, and detection information D3. FIG. 2 is a diagram illustrating an example of the pen information D1, FIG. 3 is a diagram illustrating an example of the attribute information D2, and FIG. 4 is a diagram illustrating an example of the detection information D3.

As illustrated in FIG. 2, in the pen information D1, information including a "pen identifier", a "pen ID", and a "pen name" is registered for each of the touch pens 300. The "pen identifier" is unique information, such as a manufacturing number and a serial number of the touch pen 300, by which it is possible to uniquely identify the touch pen 300, and is represented by, for example, an alphanumeric character and a symbol. The "pen ID" is identification information of the touch pen 300. The "pen name" is a name of the touch pen 300. In the present embodiment, the "pen names" and the "pen IDs" of the four touch pens 300 are registered. A name registered with the "pen name" of the pen information D1 may be labeled by, for example, putting a seal or the like to a grip of the touch pen 300. The pen information D1 is registered in advance by the user of the display device 1. The information of the "pen identifier", the "pen ID", and the "pen name" is registered with the pen information D1 as follows, for example. A communicator 230 includes an attachment to which a wireless dongle is attached, and the wireless dongle has a function for performing wireless communication with the touch pen 300. Examples of the wireless communication to be employed include wireless communication that complies with IEEE 802.11 standard, Bluetooth (registered trademark), ZigBee (registered trademark), and infrared communication. The wireless dongle performs wireless communication with the touch pen 300 when the touch pen 300 is registered to acquire the pen identifier from the touch pen 300, and assigns an arbitrary pen ID to the pen identifier. The controller 210 acquires the pen identifier and the pen ID of the touch pen 300 registered with the wireless dongle via the communicator 230, and registers the pen identifier and the pen ID with the pen information D1. The controller 210 registers the pen name with the pen information D1 in association with the pen identifier and the pen ID. The "pen name" may be a registration number. For example, the registration number applied in the order of pens for which the user registers a pen setting on a pen setting screen may be registered with the pen information D1. Further, only the pen ID may be registered with the pen information D1.

As illustrated in FIG. 3, "setting information" is registered with the attribute information D2 for each attribute. The "attribute" is information including a property and a characteristic of the touch pen 300. For example, the "attribute" includes a "color" indicating a display color (writing color) of the touch pen 300, a "type" indicating a function of the touch pen 300, and a "thickness" indicating a thickness of a pen point (display line) of the touch pen 300. The "setting information" is information indicating a specific setting content corresponding to the "attribute". In the present embodiment, "black (BK)", "blue (BL)", "red (RD)", "green (GN)", "yellow (YL)", and "white (WT)" are registered in the "color". "Pen", "marker", "eraser", and "area selection" are registered in the "type". "Extra fine", "fine", "normal", "thick", and "extra thick" are registered in the "thickness". A previously set content (default) may be registered in the attribute information D2, or the user of the display device 1 may register the attribute information D2 in advance. The attributes include at least one of a color, a type ("pen" or "marker"), and a thickness displayed on the input surface (touch display 100) with the touch pen 300, an erasing function (eraser function) for erasing information displayed on the input surface, and a selection function for selecting information displayed on the input surface.

As illustrated in FIG. 4, the "pen ID" is registered with the detection information D3 for each of touch pens 300 detected by the control device 200 (controller 210). Each time the controller 210 detects the touch pen 300, the controller 210 acquires the pen ID and registers the acquired pen ID with the detection information D3. Upon detection of the touch pen 300, the control device 200 registers the information on the attribute set for the touch pen 300 with the detection information D3. FIG. 4 illustrates the detection information D3 where information on a pen ID "001" and attributes ("red (RD)", "pen", and "extra fine") corresponding to the touch pen A, and information on a pen ID "002" and attributes such as ("yellow (YL)", "marker", and "thick") corresponding to the touch pen B are registered. That is, the state illustrated in FIG. 4 indicates a state where the touch pen A and the touch pen B are communicably connected to the control device 200 to perform an input operation (enabled state). The controller 210 registers the information with the detection information D3 each time the controller 210 detects the touch pen 300. If the communication between the touch pen 300 and the control device 200 is cut off, the controller 210 deletes the information of the touch pen 300 from the detection information D3.

Further, the storage 220 stores therein handwritten information including a character and a figure input by the user with the touch pen 300 on the touch display 100, and input information including text information obtained by converting a handwritten character into a text format. The input information includes an input image of the handwritten information and the text information, position coordinates of the handwritten information, and a font size of the information. Further, the input information includes information on an order (time series) in which the handwritten information is input by the user.

In another embodiment, some or all of the information such as the pen information D1, the attribute information D2, and the detection information D3 may be stored in a server accessible from the control device 200. In this case, the controller 210 of the control device 200 may acquire the information from the server and execute processes such as a display process (see FIG. 19 and the like) described later.

Further, the storage 220 stores therein a control program such as a display program for causing the controller 210 to execute a display process (see FIG. 19) described later. For example, the display program is recorded non-temporarily on a computer-readable recording medium such as a USB, a CD, or a DVD, read by a reading device (not illustrated) such as a USB drive, a CD drive, or a DVD drive electrically connected to the control device 200, and stored in the storage 220. Further, the display program may be downloaded from a server accessible from the control device 200 and stored in the storage 220. The display program is an example of an information processing program according to the present disclosure.

The controller 210 includes control devices such as a CPU, a ROM, and a RAM. The CPU is a processor that executes various types of arithmetic processes. The ROM is a non-volatile storage in which a control program such as BIOS and OS for causing the CPU to execute various types of arithmetic processes is stored in advance. The RAM is a volatile or non-volatile storage that stores various types of information, and is used as a temporary storage memory (working region) for various types of processes executed by the CPU. The controller 210 controls the control device 200 by causing the CPU to execute various types of control programs stored in advance in the ROM or the storage 220.

Specifically, as illustrated in FIG. 1, the controller 210 includes various processing devices such as an input detector 211, an input number determiner 212, a display processor 213, and an attribute setter 214. The controller 210 functions as the various types of processing devices by causing the CPU to execute various types of processes according to the display program. Moreover, some or all of the process devices may be configured by an electronic circuit. The display program may be a program for causing a plurality of processors to function as the various types of processing devices. In addition, the present disclosure includes the recording medium where the display program is recorded, and one or more processors, and the processors may execute processes described later executed by the input detector 211, the input number determiner 212, the display processor 213, and the attribute setter 214.

Figure 5:
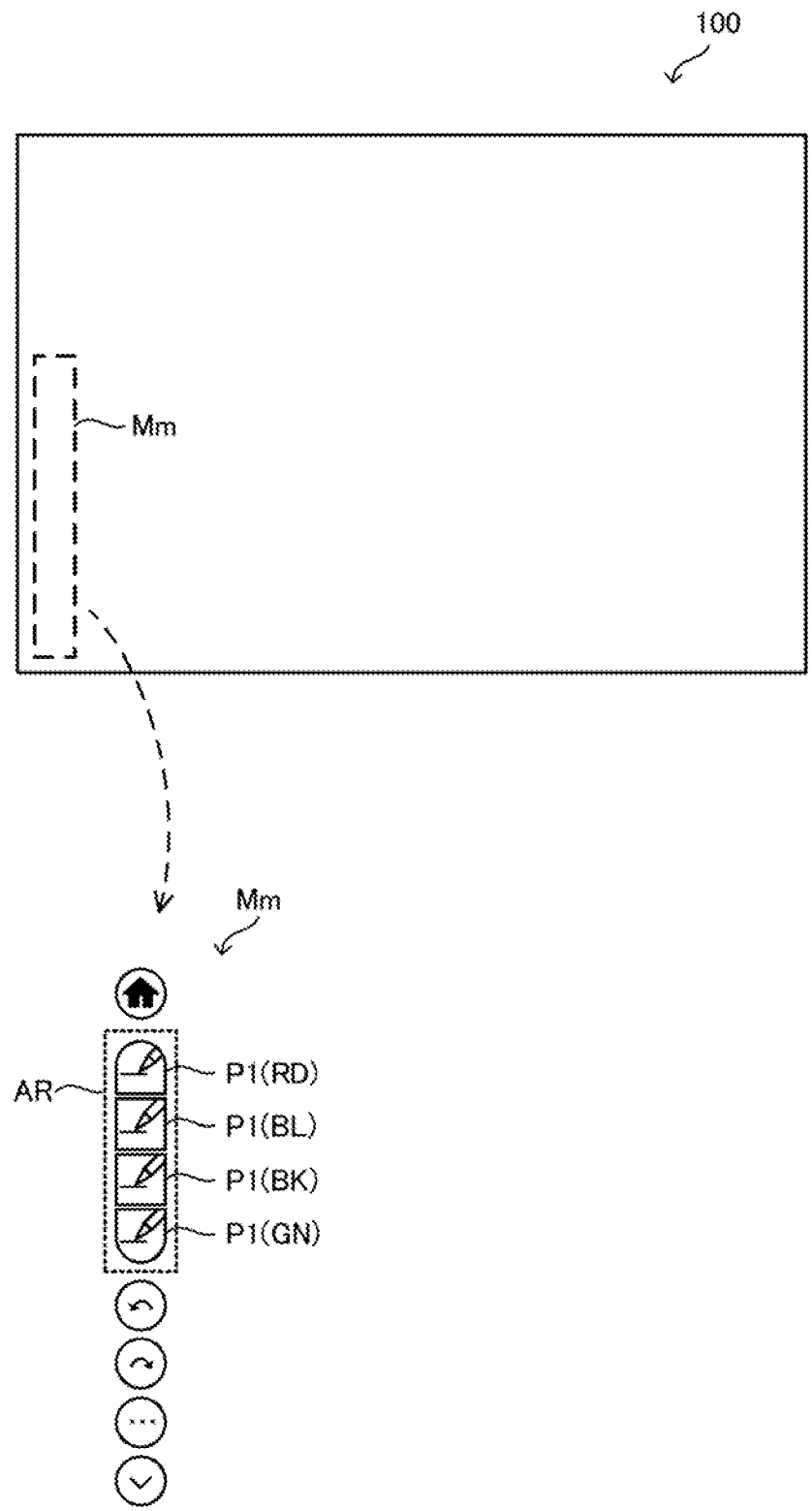
FIG. 5 is a diagram illustrating an example of a display screen displayed on the display device according to the embodiment of the present disclosure.

Here, an example of a display screen displayed on the display 120 of the touch display 100 is illustrated in FIG. 5. A main menu Mm is displayed on the display screen illustrated in FIG. 5. The main menu Mm includes a plurality of function icons to which predetermined functions are assigned. The plurality of function icons include a plurality of attribute icons to which functions for setting the attributes of the touch pen 300 are assigned. The plurality of attribute icons are arranged in a specific region AR being a part of the main menu Mm. The specific region AR is, for example, one specific region of the display screen or a plurality of specific regions of the display screen, and is a region for displaying, as a group, a plurality of attribute icons superimposed and displayed to be movable in a part of a sheet on which a drawing object is arranged. The specific region AR is a region having a setting value in which a ratio (area) of the touch display 100 to the display screen is set in advance. For example, if the four touch pens 300 are usable in the display device 1, a region having an area where at least four attribute icons are displayable is set to the specific region AR. The plurality of attribute icons displayed in the specific region AR may be configured to be movable in the display screen by a predetermined operation (a drag and drop operation or the like) with the touch pen 300, a user's finger or the like. Each of the attribute icons are an example of an attribute setting object according to the present disclosure, and the specific region AR is an example of a specific region according to the present disclosure. The attribute setting object according to the present disclosure is not limited to an icon, and may be a selectable text character.

In the present embodiment, four attribute icons P1 (RD), P1 (BL), P1 (BK), and P1 (GN) are arranged in the specific region AR. The attribute icon P1 (RD) is a function icon for setting the color (writing color) of the touch pen 300 to "red", the attribute icon P1 (BL) is a function icon for setting the color of the touch pen 300 to "blue", the attribute icon P1 (BK) is a function icon for setting the color (writing color) of the touch pen 300 to "black", and the attribute icon P1 (GN) is a function icon for setting the color of the touch pen 300 to "green". For example, if the user touches (selects) the desired attribute icon P1 with the touch pen 300, the color of the touch pen 300 is set to the color assigned to the touched attribute icon P1. A plurality of attribute icons having functions different from each other are arranged in the specific region AR. Further, for example, an attribute icon frequently used is arranged in the specific region AR. In the specific region AR, the plurality of attribute icons may be arranged in a line in a vertical direction, may be arranged in a line in a horizontal direction, or may be arranged in a plurality of rows and a plurality of columns.

Here, for example, if the user A touches, with the touch pen A, the screen or touches any of the attribute icons P1 on the screen, the controller 210 sets the touch pen A to a communication mode and enables the input operation of the touch pen A to the touch display 100. If the user A does not use the touch pen A for a certain period of time after the touch pen A is set to the communication mode, the controller 210 cuts off the communication with the touch pen A and sets the touch pen A to a sleep mode. In the sleep mode, if the user A again touches, with the touch pen A, the screen or touches any of the attribute icons P1 on the screen, the controller 210 cancels the sleep mode of the touch pen A and sets the touch pen A to the communication mode.

Figure 6:
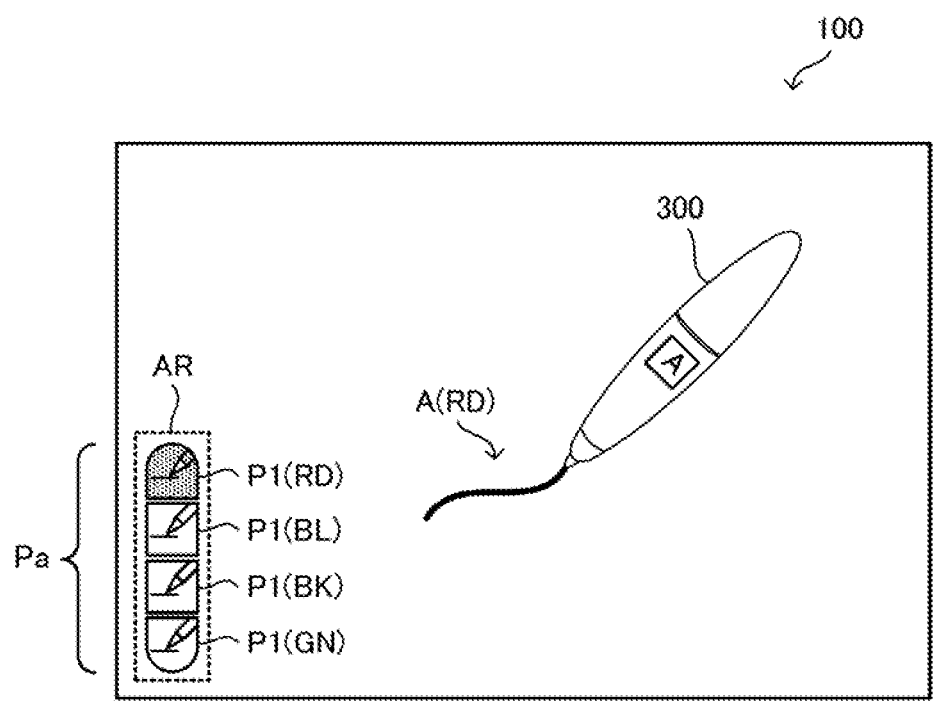
FIG. 6 is a diagram illustrating an example of a display screen displayed on the display device according to the embodiment of the present disclosure.

FIG. 6 illustrates a state in which the touch pen A is set to the communication mode and the input operation on the touch display 100 is enabled. In FIG. 6 and the subsequent figures, only the plurality of attribute icons arranged in the specific region AR are illustrated for the main menu Mm. In FIG. 6, the attribute icon P1 (RD) is highlighted to indicate that the touch pen A is set to the "red" attribute.

The input detector 211 detects the input information input by the touch pen 300 to the touch display 100 (input surface). The input detector 211 is an example of an input detector according to the present disclosure. Specifically, the input detector 211 detects position coordinates of a position specified by the touch pen 300 on the touch panel 110. For example, as illustrated in FIG. 6, if the user A performs handwriting input on the touch panel 110 with the touch pen A, the input detector 211 detects the position coordinates of the input position.

The input detector 211 acquires the pen identifier from the touch pen 300 to detect the identification information (pen ID) of the touch pen 300. For example, the input detector 211 acquires the pen identifier from the touch pen 300 by using Bluetooth (registered trademark), Zigbee (registered trademark), or the like to acquire the pen ID associated with the pen identifier by referring to the pen information D1 (see FIG. 2). Each of the position coordinates and the identification information (pen ID) is an example of input information according to the present disclosure. In the example illustrated in FIG. 6, upon detection of the position coordinates of the position input by the touch pen A, the input detector 211 acquires the pen identifier from the touch pen A to acquire the pen ID "001" of the touch pen A. In addition, for example, if the touch pen A is activated and the communication between the control device 200 and the touch pen A is established, the input detector 211 may acquire the pen identifier from the touch pen A and acquire the pen ID "001" of the touch pen A. The input detector 211 registers the acquired pen ID "001" and the attribute information on a drawing set to the touch pen A with the detection information D3 (see FIG. 4). The touch pen 300 registered with the detection information D3 is a touch pen of which the input operation onto the touch display 100 (input surface) is enabled. Each time the input detector 211 acquires the pen ID, the input detector 211 registers the pen ID and the attribute information with the detection information D3.

The input number determiner 212 determines an input number N indicating the number of touch pens 300 in which the input operation into the touch display 100 (input surface) is enabled, based on the input information (for example, the pen ID) detected by the input detector 211. The input number determiner 212 is an example of an input number determiner according to the present disclosure, and the input number N is an example of an input number according to the present disclosure. Specifically, the input number determiner 212 determines, as the input number N, the number of pen IDs detected by the input detector 211 and registered with the detection information D3. In the example illustrated in FIG. 6, only the pen ID "001" of the touch pen A is detected, and thus, the input number determiner 212 determines that the input number N is "1".

In the specific region AR, the display processor 213 displays an attribute icon in which the attribute of the touch pen 300 is settable for each of the touch pens 300 in the touch display 100, based on the input number N determined by the input number determiner 212. That is, the display processor 213 displays a plurality of attribute icons corresponding to each of the plurality of touch pens 300, based on the input number N, within a range of the specific region AR. Further, the display processor 213 displays a plurality of attribute icons with respectively associated attributes being different from one another in the specific region AR. Further, for example, an attribute icon frequently used is arranged in the specific region AR. The display processor 213 is an example of a display processor according to the present disclosure. Further, the display processor 213 displays the main menu Mm and the like in the touch display 100.

The attribute setter 214 sets the attribute of the touch pen 300, based on the attribute icon selected by the touch pen 300. The attribute setter 214 is an example of an attribute setter according to the present disclosure. For example, if the user A touches the attribute icon P1 (BL) with the touch pen A, the attribute setter 214 sets the color of the touch pen A to "blue". Further, the attribute setter 214 registers the set attribute information with the detection information D3 (see FIG. 4). For example, if the attribute "blue" is set to the touch pen A, the attribute setter 214 registers "blue (BL)" with the detection information D3 in association with the pen ID "001". The attribute setter 214 registers not only the color attribute information but also attribute information such as a pen type and a pen thickness with the detection information D3 (see FIG. 4). In the following description, for convenience of explanation, the description will be mainly focused on the attribute of "color" among the plurality of attributes.

Here, the plurality of attribute icons arranged in the specific region AR are assigned to one or more touch pens 300 in which the input operation on the touch display 100 is enabled. In the example illustrated in FIG. 6, one touch pen A is enabled, and thus, all (four in this case) attribute icons arranged in the specific region AR are assigned to the touch pen A. That is, the attribute icons P1 (RD), P1 (BL), P1 (BK), and P1 (GN) are assigned to a setting menu Pa in which the attributes of the touch pen A are settable, and these four attribute icons function as an attribute icon for the touch pen A. The display processor 213 assigns each of the attribute icons to the touch pen A and displays each of the attribute icons in the touch display 100. The user A sets (changes) the attribute (here, "color") by touching a desired attribute icon with the touch pen A. For example, if the user A touches the attribute icon P1 (BL) with the touch pen A, the attribute setter 214 changes the color attribute of the touch pen A from "red" to "blue".

Figure 7:
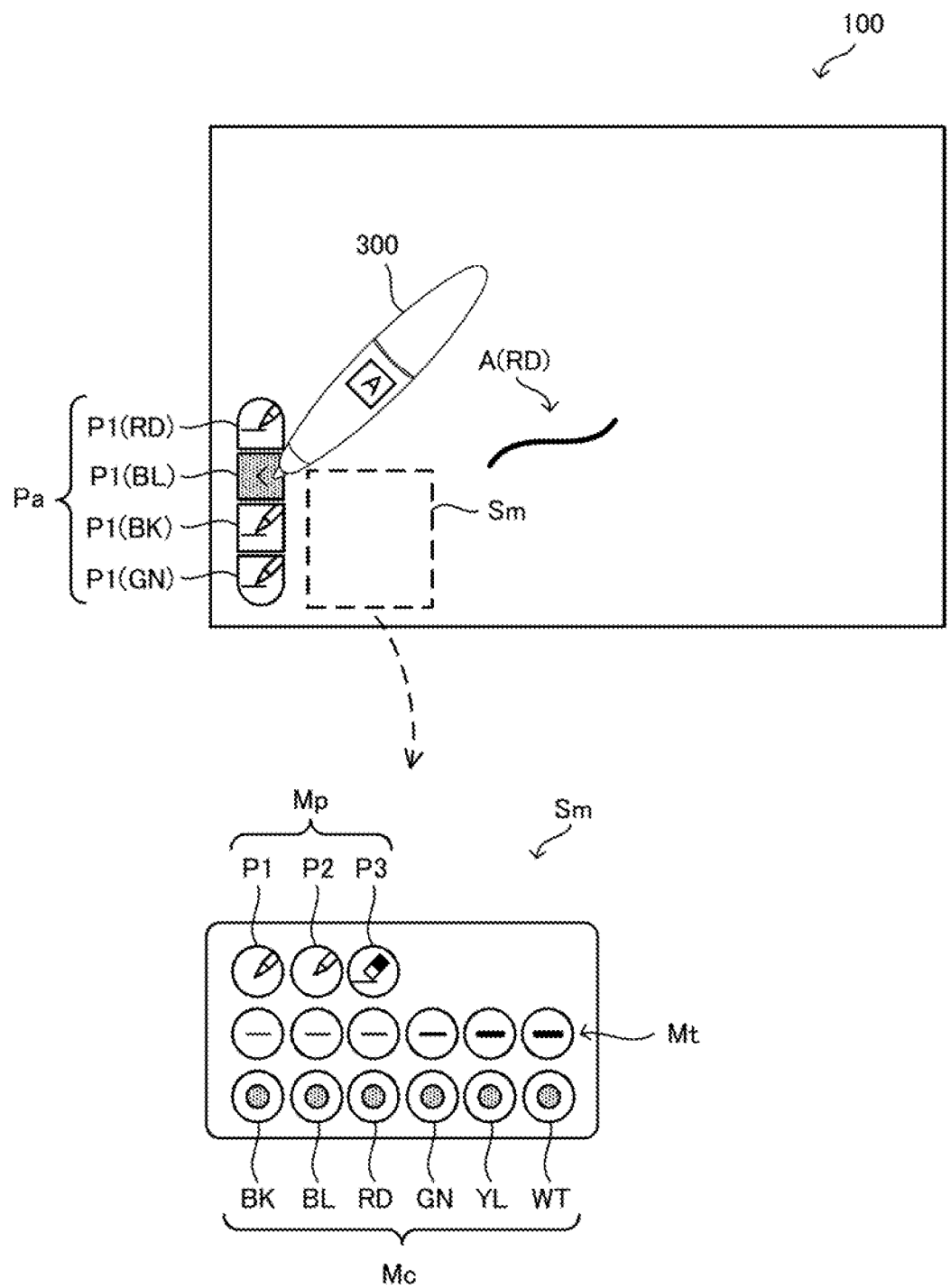
FIG. 7 is a diagram illustrating an example of a display screen displayed on the display device according to the embodiment of the present disclosure.

If the user A performs a specific operation such as touching the selected attribute icon with the touch pen A or double-clicking any of the attribute icons, the display processor 213 displays a submenu Sm illustrated in FIG. 7 in the touch display 100. The submenu Sm includes an attribute icon to apply a detailed setting to each of the attributes such as a "type", a "thickness", and a "color". "P1" included in a menu Mp indicates a pen attribute icon, "P2" indicates a marker attribute icon, and "P3" indicates an eraser attribute icon. A menu Mt illustrates a line thickness attribute icon, and a menu Mc illustrates a color attribute icon. If the user A touches a desired attribute icon with the touch pen A in the submenu Sm, the attribute setter 214 sets (changes) the attribute of the touch pen A. Further, the display processor 213 arranges the attribute icons by replacing the attribute icon selected in the submenu Sm with the attribute icon in the specific region AR. The user is capable of editing the attribute icon arranged in the specific region AR, based on an operation on the submenu Sm. If the plurality of touch pens 300 are in a state of being capable of performing the input operation (enabled state), an attribute icon may be subject to an identifiable display such as a gray-out display or a dotted-line display so that it is possible to recognize that an attribute (color) already set to another touch pen 300 is not selectable.

A specific example will be described in which the number of touch pens 300 (input number N) in which the input operation on the touch display 100 is enabled, is plural.

Figure 8:
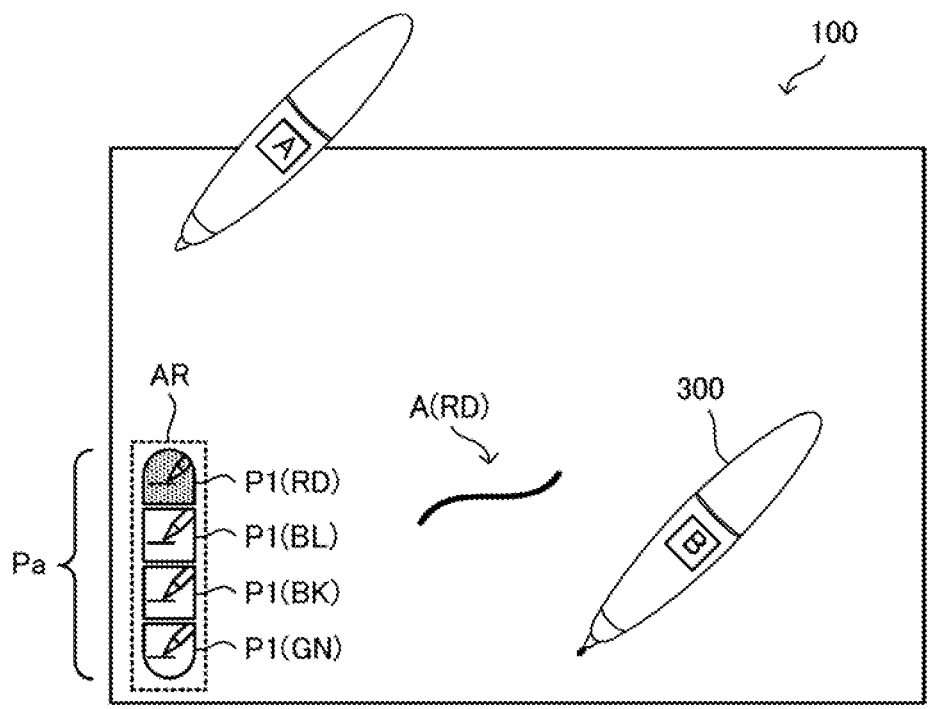
FIG. 8 is a diagram illustrating an example of a display screen displayed on the display device according to the embodiment of the present disclosure.

In the state illustrated in FIG. 6, if the user B touches the screen with the touch pen B, the controller 210 establishes the communication with the touch pen B, sets the touch pen B to a communication mode, and sets the touch pen B to "yellow". For example, if the input information corresponding to the touch pen B is detected by the input detector 211, the attribute setter 214 may set an attribute (here, "yellow (YL)") different from the attribute "red (RD)" corresponding to the touch pen A, to the touch pen B. That is, the attribute setter 214 may set an attribute to be set to a new touch pen 300, to an attribute different from an attribute already set to another touch pen 300 to prevent an overlapping with the attribute already set to the other touch pen 300. FIG. 8 illustrates a state in which the communication mode is set to the touch pen B, and the input operations on the touch display 100 with the touch pens A and B are enabled.

If the user B performs a handwriting input on the touch display 100 with the touch pen B, the input detector 211 detects the position coordinates of the position input by the touch pen B and receives an identification signal from the touch pen B to detect the pen ID "002" of the touch pen B. The input detector 211 registers the detected pen ID "002" with the detection information D3 (see FIG. 4). The attribute setter 214 sets the attribute of "yellow" to the touch pen B, and registers "yellow (YL)" with the detection information D3 in association with the pen ID "002". Thus, the input number determiner 212 determines that the input number N is "2".

Figure 9:
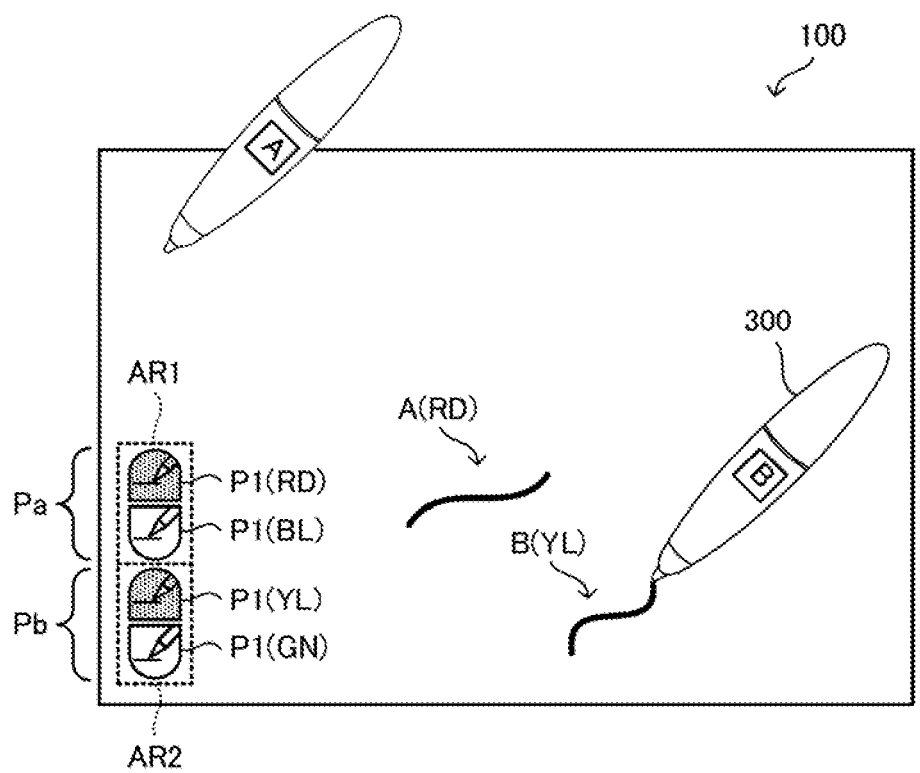
FIG. 9 is a diagram illustrating an example of a display screen displayed on the display device according to the embodiment of the present disclosure.

As illustrated in FIG. 9, the display processor 213 displays the setting menu Pa corresponding to the touch pen A and a setting menu Pb corresponding to the touch pen B in an aligned manner in the specific region AR. For example, the display processor 213 displays the two attribute icons P assigned to the touch pen A and the remaining two attribute icons P1 assigned to the touch pen B, out of the four attribute icons P1, in an aligned manner. As illustrated in FIG. 9, the display processor 213 displays the attribute icons P1 (RD) and P1 (BL) assigned to the touch pen A and the attribute icons P1 (YL) and P1 (GN) assigned to the touch pen B in an aligned manner. Here, the touch pen A is an example of a first input device according to the present disclosure, and the attribute icons P1 (RD) and P1 (BL) are examples of a first attribute setting object according to the present disclosure. The touch pen B is an example of a second input device according to the present disclosure, and the attribute icons P1 (YL) and P1 (GN) are examples of a second attribute setting object according to the present disclosure.

Figure 14:
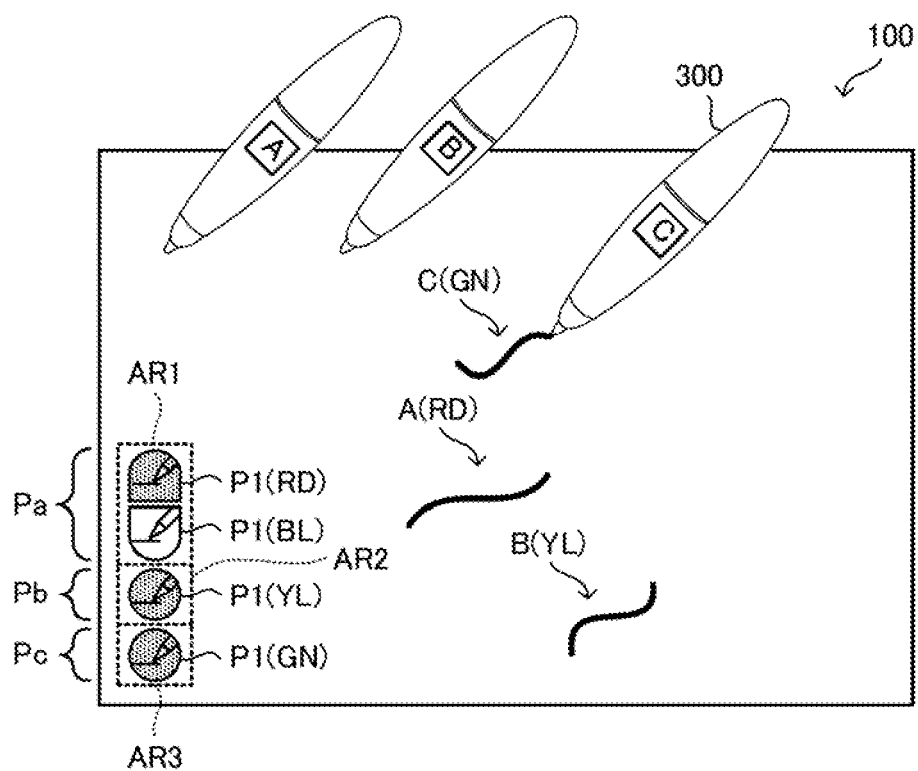
FIG. 14 is a diagram illustrating an example of a display screen displayed on the display device according to the embodiment of the present disclosure.

Here, the display processor 213 displays the plurality of attribute icons P1 collectively as a group for each of the touch pens 300 in the specific region AR. For example, in the example illustrated in FIG. 9, out of the four attribute icons P1, the display processor 213 displays the two upper attribute icons P1 assigned to the touch pen A collectively as a group, and displays the two lower attribute icons P1 assigned to the touch pen B collectively as a group. In addition, the display processor 213 may display the plurality of attribute icons P1 joined (connected) for each of the touch pens 300 (for each group) in the specific region AR. Further, in the specific region AR, the display processor 213 performs a display so that the attribute icons P1 are aligned in an order in which the touch pens 300 are detected (in an order in which the touch pens 300 are enabled). For example, as illustrated in FIG. 14, if the touch pen A, the touch pen B, and the touch pen C are detected in this order, in the specific region AR, the display processor 213 displays the upper two attribute icons P1 assigned to the touch pen A, displays the middle one attribute icon P1 assigned to the touch pen B, and displays the lower one attribute icon P1 assigned to the touch pen C, out of the four attribute icons P1, in the specific region AR.

Further, the display processor 213 performs a display where the function of the attribute icon P1 is changed to a function corresponding to the touch pen 300. Here, as illustrated in FIG. 9, the display processor 213 displays the attribute icon P1 (YL) corresponding to the touch pen B, changed from the attribute icon P1 (BK). In FIG. 9, the attribute icon P1 (YL) is highlighted to indicate that the attribute of "yellow" is set to the touch pen B. Thus, in the specific region AR, when the four attribute icons P1 assigned to the touch pen A (see FIG. 8) are displayed, if the input information corresponding to the touch pen B is detected by the input detector 211 (see FIG. 8), as illustrated in FIG. 9, the display processor 213 performs a display so that some (two in this case) of the four attribute icons P1 are switched to the attribute icon P1 corresponding to the touch pen B, and assigned to the touch pen B.

As illustrated in FIG. 9, the display processor 213 divides the specific region AR into a region AR1 where the setting menu Pa (attribute icons P1) corresponding to the touch pen A is arranged, and a region AR2 where the setting menu Pb (attribute icons P1) corresponding to the touch pen B is arranged.

The total number of the attribute icons P1 displayed in the specific region AR before the specific region AR is divided and the total number of the attribute icons P1 displayed in the specific regions AR (regions AR1 and AR2) after the specific region AR is divided is the same. Here, before and after the specific region AR is divided, the number of attribute icons P1 is four.

Figure 10:
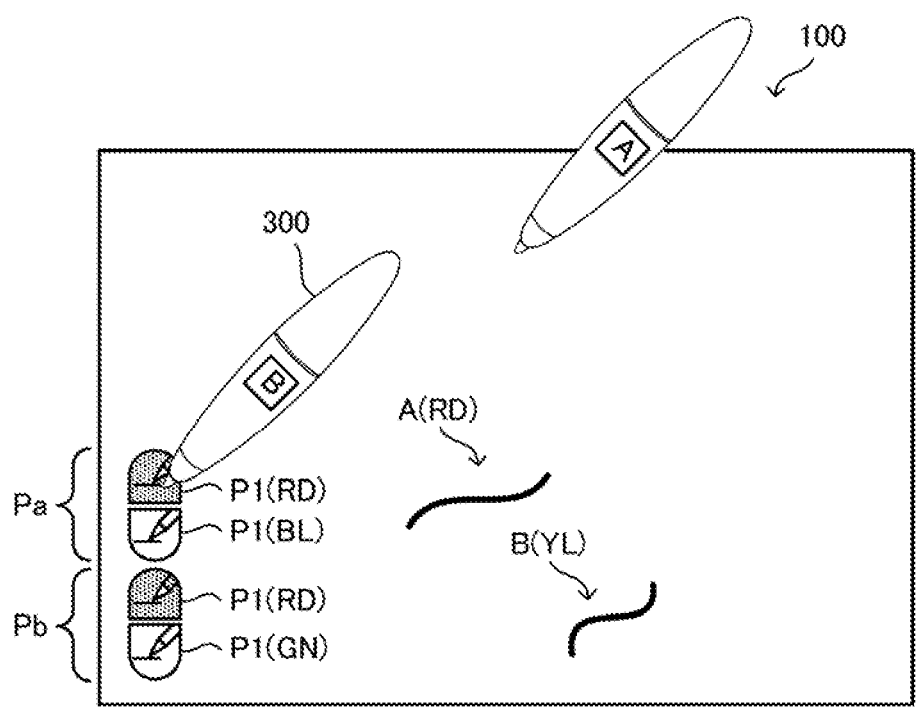
FIG. 10 is a diagram illustrating an example of a display screen displayed on the display device according to the embodiment of the present disclosure.
Figure 11:
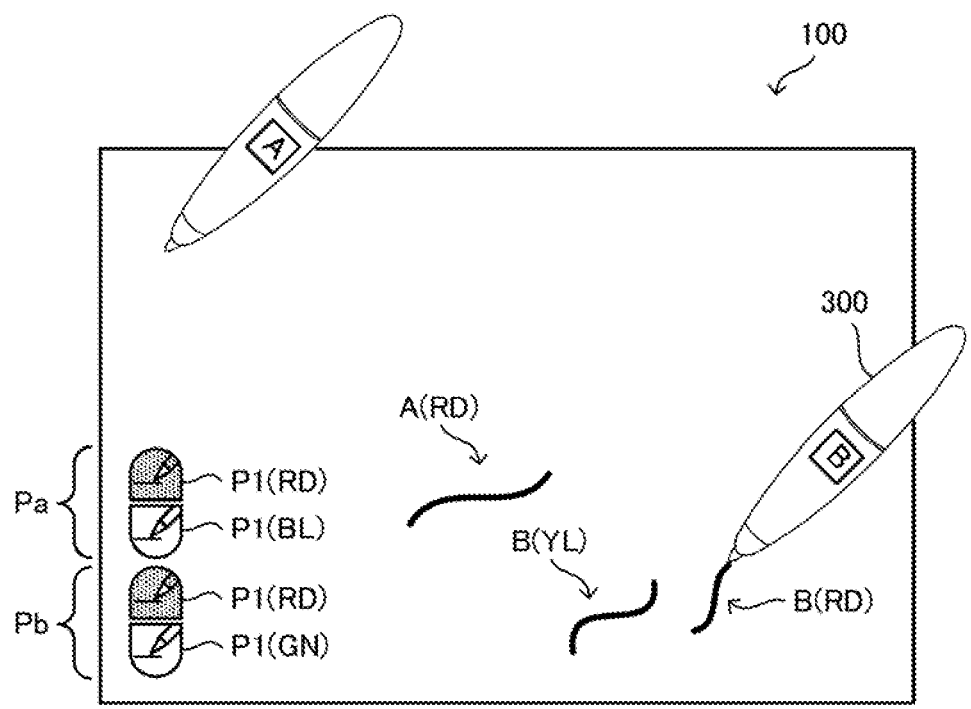
FIG. 11 is a diagram illustrating an example of a display screen displayed on the display device according to the embodiment of the present disclosure.

Here, the plurality of touch pens 300 (in FIG. 9, the touch pens A and the touch pens B) where the input operations are enabled are configured to select all the attribute icons P1 displayed in the specific region AR. Specifically, if the attribute icons P1 included in the setting menu Pa is selected by the touch pen B different from the touch pen A corresponding to the setting menu Pa, the attribute setter 214 sets the attribute of the touch pen B, based on the selected attribute icons P1. For example, as illustrated in FIG. 10, if the user B touches the attribute icon P1 (RD) included in the setting menu Pa with the touch pen B, as illustrated in FIG. 11, the display processor 213 displays the attribute icon P1 (RD) changed from the attribute icon P1 (YL) selected so far of the setting menu Pb, and the attribute setter 214 changes the color of the touch pen B from "yellow" to "red". Thus, each of the touch pens 300 is capable of operating the attribute icons displayed in the specific region AR. In FIG. 11, the display processor 213 may display the attribute icon P1 (YL) not changed from the attribute icon P1 (YL) selected so far for the touch pen B.

Figure 12:
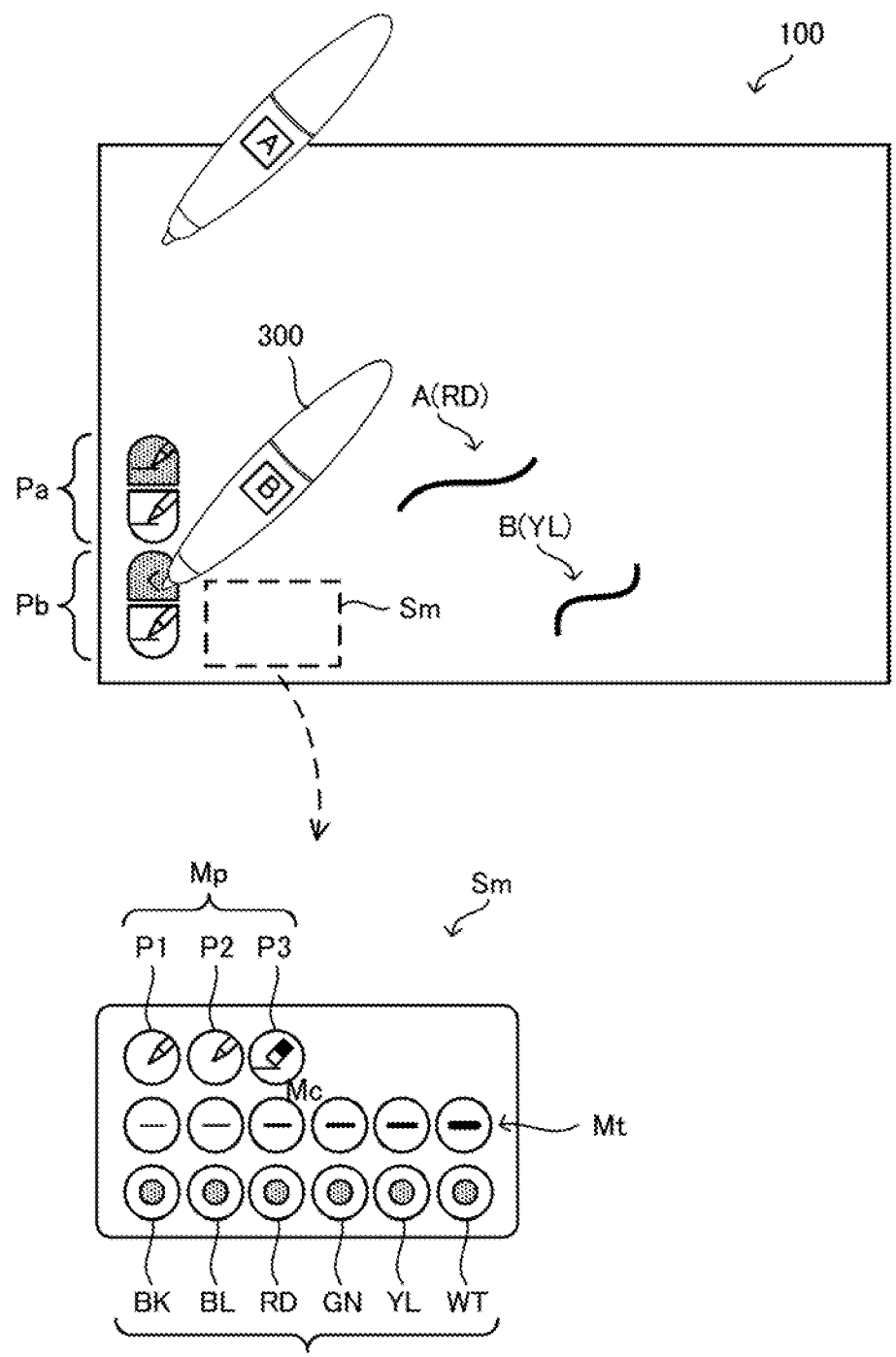
FIG. 12 is a diagram illustrating an example of a display screen displayed on the display device according to the embodiment of the present disclosure.

On the other hand, the touch pen B is prohibited from causing a display of the submenu Sm corresponding to the touch pen A, selecting an attribute icon of the submenu Sm, and replacing the setting menu Pa with an attribute icon of the submenu Sm. Similarly, the touch pen A is prohibited from causing a display of the submenu Sm corresponding to the touch pen B, selecting an attribute icon of the submenu Sm, and replacing the setting menu Pb with an attribute icon of the submenu Sm. That is, the operation onto the submenu Sm is permitted only to the touch pen 300 to which the submenu Sm is assigned. Therefore, as illustrated in FIG. 12, for example, if the user B double-clicks the setting menu Pb with the touch pen B, the submenu Sm assigned to the touch pen B is displayed, and as a result, it is possible to set the attribute of the touch pen B. The controller 210 compares the pen ID of the touch pen 300 associated with the attribute icon with the pen ID of the touch pen 300 touching the attribute icon, and executes the above process.

Figure 13:
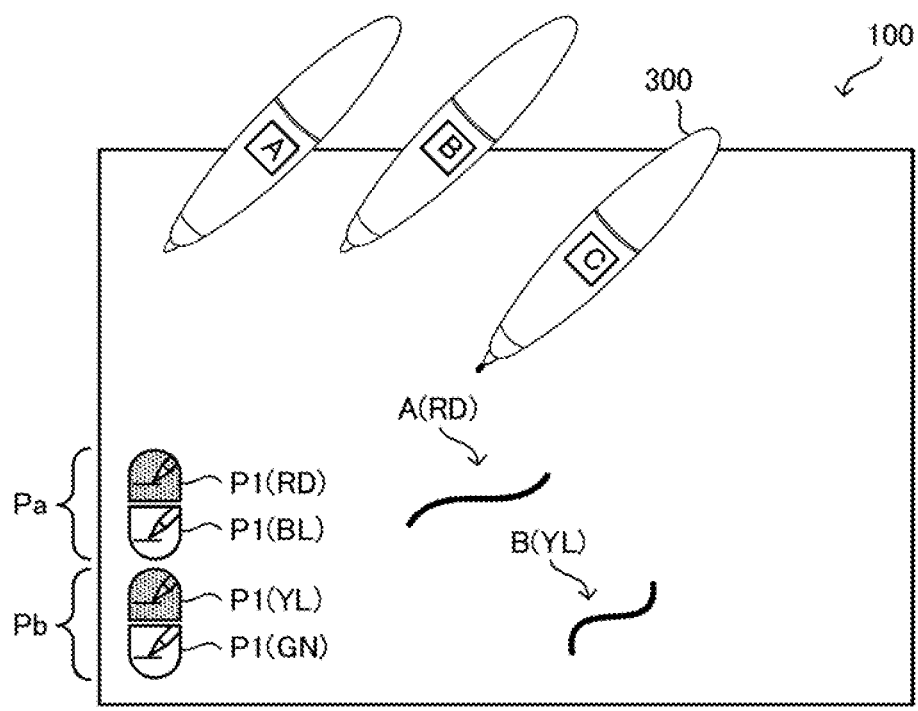
FIG. 13 is a diagram illustrating an example of a display screen displayed on the display device according to the embodiment of the present disclosure.

If the number of touch pens 300 further increases from the state illustrated in FIG. 9, the controller 210 executes the process according to the above-described example. For example, FIG. 13 illustrates a state in which the touch pen C is set to a communication mode, and the input operations by the touch pens A, B, and C onto the touch display 100 are enabled.

If the user C performs a handwriting input on the touch display 100 with the touch pen C, the input detector 211 detects the position coordinates of a position input by the touch pen C, receives an identification signal from the touch pen C, and detects the pen ID "003" of the touch pen C. The input detector 211 registers the detected pen ID "003" with the detection information D3. The attribute setter 214 sets the attribute of "green" to the touch pen C, and registers "green (GN)" with the detection information D3 in association with the pen ID "003". Accordingly, the input number determiner 212 determines that the input number N is "3".

As illustrated in FIG. 14, the display processor 213 displays the setting menu Pa corresponding to the touch pen A, the setting menu Pb corresponding to the touch pen B, and a setting menu Pc corresponding to the touch pen C in an aligned manner in the specific region AR. For example, the display processor 213 displays the two attribute icons P1 assigned to the touch pen A, another attribute icon P1 assigned to the touch pen B, and the other attribute icon P1 assigned to the touch pen C, out of the four attribute icons P1. As illustrated in FIG. 14, the display processor 213 displays the attribute icons P1 (RD) and P1 (BL) assigned to the touch pen A, the attribute icon P1 (YL) assigned to the touch pen B, and the attribute icon P1 (GN) assigned to the touch pen C.

Further, the display processor 213 divides the specific region AR into the region AR1 where the setting menu Pa corresponding to the touch pen A is arranged, the region AR2 where the setting menu Pb corresponding to the touch pen B is arranged, and a region AR3 where the setting menu Pc corresponding to the touch pen C is arranged. Each of the touch pens A, B, and C is capable of operating the four attribute icons in the specific region AR and is also capable of displaying and operating the submenu Sm by operating the attribute icon associated to each of the touch pens A, B, and C (touching again the attribute icon which is being selected or double-clicking either of the attribute icons).

Figure 15:
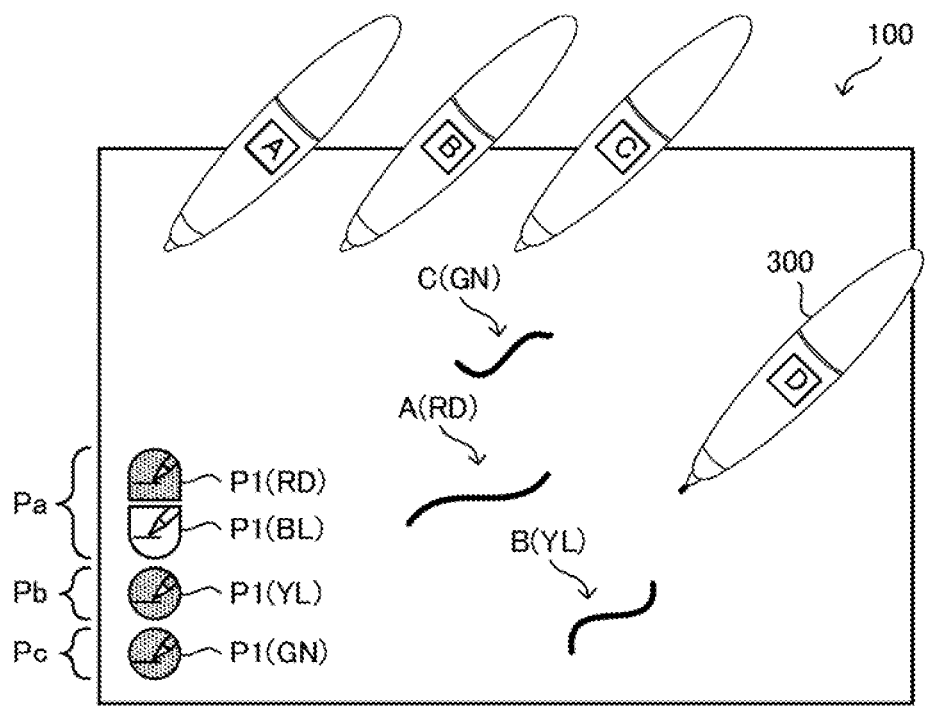
FIG. 15 is a diagram illustrating an example of a display screen displayed on the display device according to the embodiment of the present disclosure.

For example, FIG. 15 illustrates a state in which the touch pen D is set to a communication mode, and the input operations by the touch pens A, B, C, and D onto the touch display 100 are enabled.

If the user D performs a handwriting input on the touch display 100 with the touch pen D, the input detector 211 detects the position coordinates of a position input by the touch pen D, receives an identification signal from the touch pen D, and detects the pen ID "004" of the touch pen D. The input detector 211 registers the detected pen ID "004" with the detection information D3. The attribute setter 214 sets the attribute of "blue" to the touch pen D, and registers "blue (BL)" with the detection information D3 in association with the pen ID "004". Accordingly, the input number determiner 212 determines that the input number N is "4".

Figure 16:
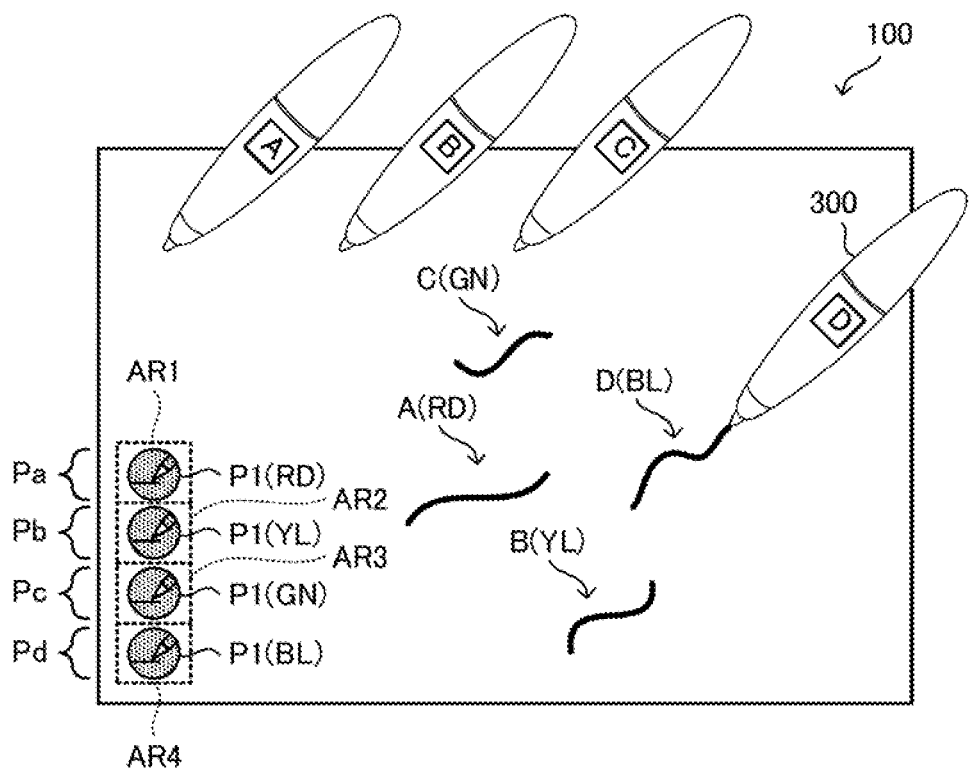
FIG. 16 is a diagram illustrating an example of a display screen displayed on the display device according to the embodiment of the present disclosure.

As illustrated in FIG. 16, the display processor 213 displays the setting menu Pa corresponding to the touch pen A, the setting menu Pb corresponding to the touch pen B, the setting menu Pc corresponding to the touch pen C, and a setting menu Pd corresponding to the touch pen D in an aligned manner in the specific region AR. For example, the display processor 213 displays one attribute icon P1 assigned to the touch pen A, another attribute icon P1 assigned to the touch pen B, another attribute icon P1 assigned to the touch pen C, and the other attribute icons P1 assigned to the touch pen D, out of the four attribute icons P1. As illustrated in FIG. 16, the display processor 213 displays the attribute icon P1 (RD) assigned to the touch pen A, the attribute icon P1 (YL) assigned to the touch pen B, the attribute icons P1 (GN) assigned to the touch pen C, and the attribute icon P1 (BL) assigned to the touch pen D.

Further, the display processor 213 divides the specific region AR into the region AR1 where the setting menu Pa corresponding to the touch pen A is arranged, the region AR2 where the setting menu Pb corresponding to the touch pen B is arranged, the region AR3 where the setting menu Pc corresponding to the touch pen C is arranged, and a region AR4 where the setting menu Pd corresponding to the touch pen D is arranged. Each of the touch pens A, B, C, and D is capable of operating the four attribute icons in the specific region AR and is also capable of displaying and operating the submenu Sm by operating the attribute icon associated to each of the touch pens A, B, and C (touching again the attribute icon which is being selected or double-clicking either of the attribute icons). In addition, the display processor 213 performs a display so that the setting menus Pa to Pd (or the divided regions AR1 to AR4) are in an order in which the touch pens 300 are detected (in an order in which the touch pens 300 are enabled) in the specific region AR. As a result, each of the users is capable of easily recognizing the attribute icon operable by the user's own touch pen 300 in the specific region AR.

Figure 17:
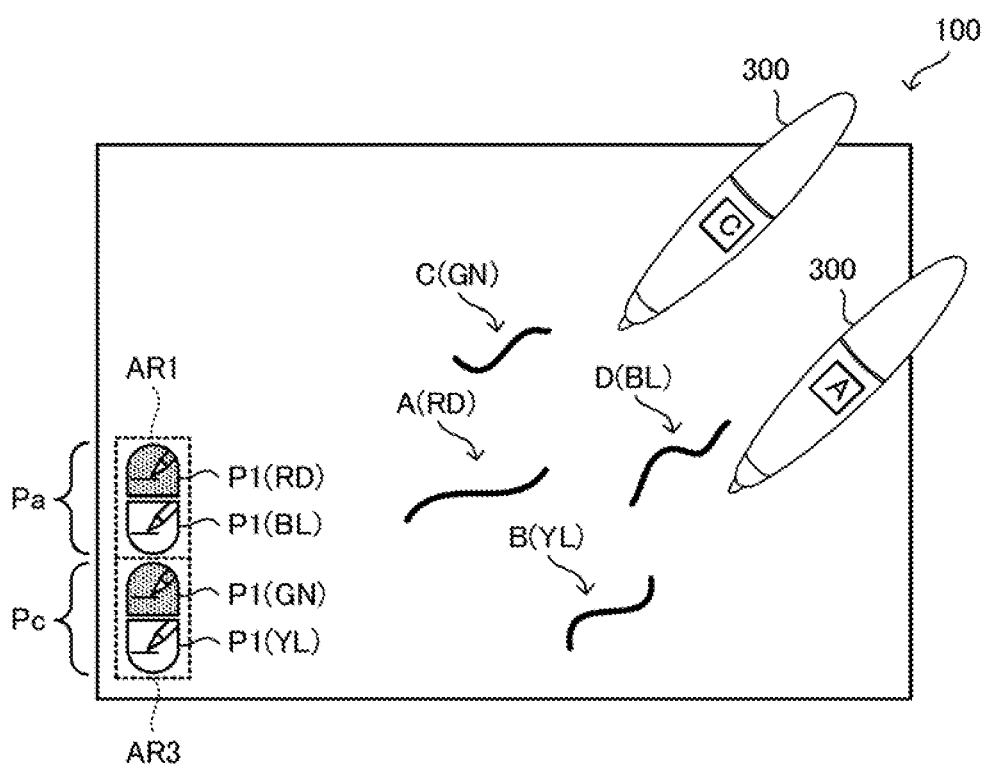
FIG. 17 is a diagram illustrating an example of a display screen displayed on the display device according to the embodiment of the present disclosure.

Here, in a state where the four touch pens A to D are used, if, for example, the user B cancels the use of the touch pen B and the user D cancels the use of the touch pen D, the controller 210 executes the following processes. For example, if the user B does not use the touch pen B for a certain period of time, the controller 210 cuts off the communication with the touch pen B and sets the touch pen B to a sleep mode. Similarly, the controller 210 sets the touch pen D to a sleep mode. Thus, the input number determiner 212 determines that the input number N is "2". Further, the display processor 213 assigns the four attribute icons to the attribute icons corresponding to the touch pens A and C in which the input operation is enabled, in the specific region AR. The display processor 213 assigns (divides) the specific region AR to (into) the region AR1 of the setting menu Pa and the region AR3 of the setting menu Pc. For example, as illustrated in FIG. 17, the display processor 213 displays the setting menu Pa including the two attribute icons P1 (RD) and P1 (BL) and the setting menu Pc including the two attribute icon P1 (GN) and P1 (YL) in the specific region AR. The display processor 213 displays the setting menu Pa in the region AR1 and the setting menu Pc in the region AR3, as illustrated in FIG. 17.

Figure 18:
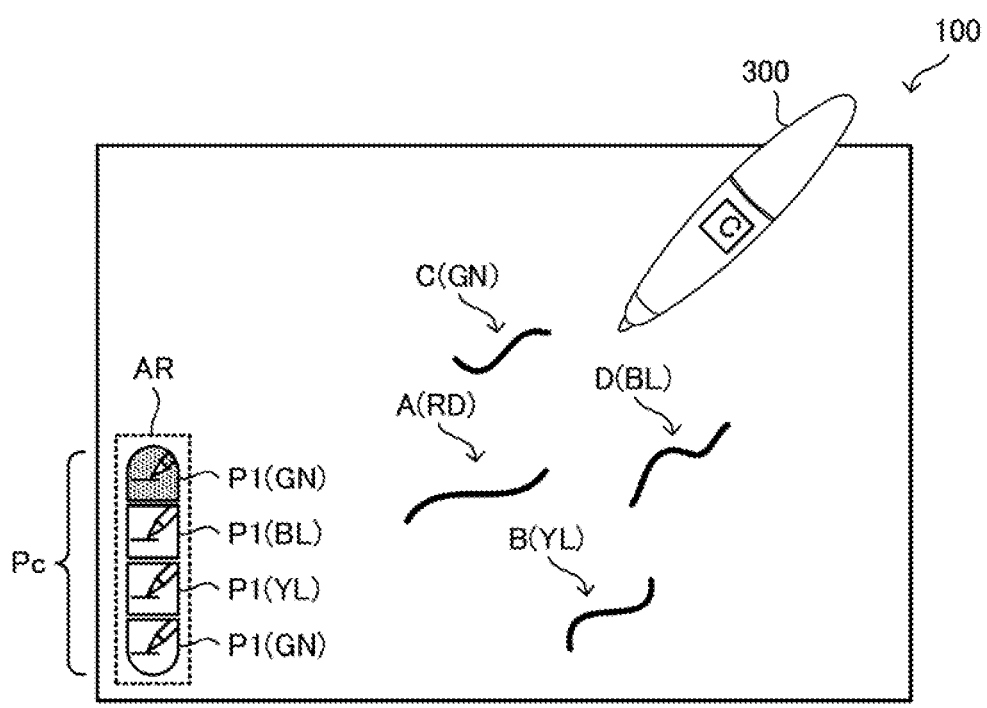
FIG. 18 is a diagram illustrating an example of a display screen displayed on the display device according to the embodiment of the present disclosure.

Subsequently, for example, if the user A cancels using the touch pen A, the controller 210 cuts off the communication with the touch pen A and shifts the touch pen A to a sleep mode. As a result, the input number determiner 212 determines that the input number N is "1". In this case, the display processor 213 assigns the four attribute icons to the attribute icon corresponding to the touch pen C in the specific region AR, as illustrated in FIG. 18.

Thus, the display processor 213 displays the attribute icon in which the attribute of the touch pen 300 is settable and the display region of the attribute icon in the touch display 100 for each of the touch pens 300 in the specific region AR, based on the input number N determined by the input number determiner 212.

Here, the display processor 213 displays the attribute icons P1 equal in amount to an input upper limit number of the touch pen 300 in the specific region AR. For example, if the number of the touch pens 300 usable in the display device 1 is four, the display processor 213 displays the four attribute icons P1 equal in amount to the number of the touch pens 300 in the specific region AR of the main menu Mm (FIG. 6). The display processor 213 displays the four attribute icons P1 assigned to each of the touch pens 300 in accordance with an increase or decrease of the input number N of the touch pen 300. Therefore, for example, if the number of the touch pens 300 usable in the display device 1 is five, the display processor 213 displays the five attribute icons P1 in the specific region AR of the main menu Mm.

The controller 210 performs a process of displaying an image in addition to the above-described processes. For example, the controller 210 generates an image to be displayed in the touch display 100, based on the position coordinates detected by the input detector 211. For example, the controller 210 generates a handwritten image, based on the position coordinates of the handwritten information input by handwriting. The controller 210 stores the generated image and information on a font size in the storage 220. Further, the controller 210 performs control to display the generated image (a handwritten image and text image) and the like in the touch display 100.

Display Process

Figure 19:
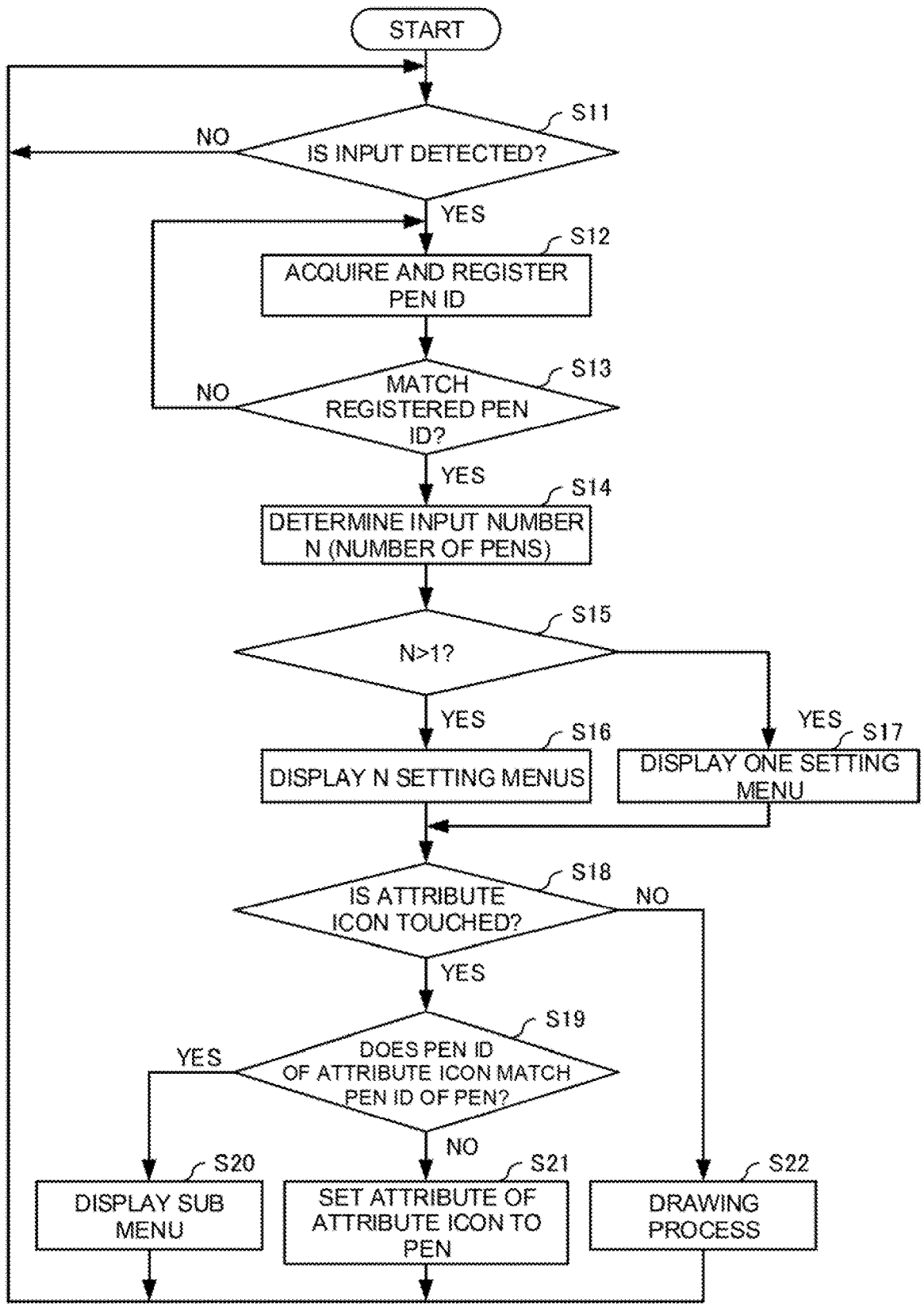
FIG. 19 is a flowchart for explaining an example of a procedure of a display process executed in the display device according to the embodiment of the present disclosure.

A display process executed in the display device 1 will be described with reference to FIG. 19 below. Specifically, in the present embodiment, the display process is executed by the controller 210 of the display device 1. The controller 210 may possibly end the display process even if the display process is not completed, in response to a predetermined operation of the user.

The present disclosure can be regarded as an invention of an information processing method in which one or more steps included in the display process are executed. Further, one or more steps included in the display process described herein may be omitted where appropriate. In addition, each of the steps in the display process may be executed in a different order as long as a similar operation and effect is obtained. Further, although a case where each of the steps in the display process is executed by the controller 210 will be described as an example here, an information processing method in which each of the steps in the display process is executed in a distributed manner by one or more processors may be regarded as another embodiment.

Firstly, in step S11, the controller 210 determines whether input information (for example, the position coordinates) input to the touch display 100 by the touch pen 300 is detected. If the input information is detected (S11: YES), the process proceeds to step S12.

In step S12, the controller 210 acquires the pen ID of the touch pen 300, based on the detected input information, and registers the acquired pen ID. For example, upon detecting the position coordinates of the position input by the touch pen A, the controller 210 receives the identification signal from the touch pen A and acquires the pen ID "001" of the touch pen A. The controller 210 registers the acquired pen ID "001" with the detection information D3 (see FIG. 4). The controller 210 registers the attribute information related to the drawing set to the touch pen A, with the detection information D3 (see FIG. 4). The controller 210 stores the detected position coordinates and the pen ID in an associated manner into the storage 220. Steps S11 and S12 are examples of an input detection process according to the present disclosure.

In step S13, the controller 210 determines whether the acquired pen ID matches the pen ID registered with the pen information D1 (see FIG. 2). If the acquired pen ID matches the pen ID registered with the pen information D1 (813: YES), the process proceeds to step S14. If the acquired pen ID does not match the pen ID registered with the pen information D1 (S13: NO), the process returns to step S12.

In step S14, the controller 210 determines the input number N indicating the number of the touch pens 300 of which the input operation onto the touch display 100 (input surface) is enabled, based on the input information detected in step S11. Specifically, the controller 210 determines, as the input number N, the number of pen IDs registered with the detection information D3. For example, if the touch pens A, B, and C are in a state where the input operation onto the touch display 100 is enabled (see FIG. 14), the controller 210 determines that the input number N is "3", and further from this state, if the touch pen D is in an enabled state (see FIG. 15), the controller 210 determines that the input number N is "4". If the touch pens B and D shift to the sleep mode from the state illustrated in FIG. 16 (see FIG. 17), the controller 210 determines that the input number N is "2". Thus, the controller 210 determines the input number N in each of the cases where the number of the touch pens 300 in which the input operation is enabled increases and decreases. Step S14 is an example of an input number determination process according to the present disclosure.

Next, in step S15, the controller 210 determines whether the input number N is greater than "1", that is, whether the input number N is plural. If the input number N is greater than "1" (if the input number N is plural) (S15: YES), the process proceeds to step 16. On the other hand, if the input number N is equal to or less than "1" (if the input number N is "1") (S15: NO), the process proceeds to step S17.

In step S16, the controller 210 performs control to display N setting menus in the specific region AR. For example, if the input number N is "2", the controller 210 performs control to display the attribute icons corresponding to the two setting menus Pa and Pb in the specific region AR as illustrated in FIG. 9. For example, if the input number N is "3", the controller 210 performs control to display the attribute icons corresponding to the three setting menus Pa, Pb, and Pc in the specific region AR, as illustrated in FIG. 14. For example, if the input number N is "4", the controller 210 performs control to display the attribute icons corresponding to the four setting menus Pa, Pb, Pc, and Pd in the specific region AR as illustrated in FIG. 16.

On the other hand, in step S17, the controller 210 performs control to display one setting menu in the specific region AR (see FIG. 6). Steps S16 and S17 are examples of a display process according to the present disclosure.

Next, in step S18, the controller 210 determines whether the attribute icon in the specific region AR is touched with the touch pen 300 in the touch display 100. If the attribute icon is touched with the touch pen 300 (S18: YES), the process proceeds to step S19. If the attribute icon is not touched by the touch pen 300 (S18: NO), the process proceeds to step S22. In step S22, the controller 210 execute a drawing process according to the input information input by the touch pen 300. Thereafter, the process returns to step S11. If the controller 210 does not detect the input information by the touch pen 300, the controller 210 may omit the drawing process and return to step S11 to determine whether an input from another touch pen 300 is detected.

In step S19, the controller 210 determines whether the pen ID of the touch pen 300 associated with the touched attribute icon matches the pen ID of the touch pen 300 touching the attribute icon. If the pen ID of the touch pen 300 associated with the touched attribute icon matches the pen ID of the touch pen 300 touching the attribute icon (S19: YES), the process proceeds to step S20. On the other hand, if the pen ID of the touch pen 300 associated with the touched attribute icon does not match the pen ID of the touch pen 300 touching the attribute icon (S19: NO), the process proceeds to step S21.

For example, as illustrated in FIG. 12, if the user B touches the attribute icon P1 (YL) of the setting menu Pb with the touch pen B, the pen ID "002" of the touch pen B associated with the attribute icon P1 (YL) matches the pen ID "002" of the touch pen B touching the attribute icon P1 (YL). In this case, in step S20, the controller 210 performs control to display the submenu Sm in the touch display 100. For example, as illustrated in FIG. 12, the controller 210 performs control to display the submenu Sm assigned to the touch pen B in the touch display 100. If the user B touches a desired attribute icon with the touch pen B in the submenu Sm, the controller 210 changes the attribute of the touch pen B. After step S20, the process proceeds to step S11. In the state illustrated in FIG. 12, if the user B touches the attribute icon P1 (GN) of the setting menu Pb with the touch pen B, the controller 210 may change the color attribute of the touch pen B from "yellow" to "green" without causing the submenu Sm to be displayed. Thus, in a case where the setting menu Pb includes a plurality of attribute icons P1 (for example, P1 (YL) and P1 (GN)), if the user touches the attribute icon P1 (GN) different from the attribute icon P1 (YL) of the currently set attribute with the touch pen B, the controller 210 may change the attribute of the touch pen B to the attribute of the different attribute icon P1 (GN).

On the other hand, as illustrated in FIG. 10, if the user B touches one attribute icon P1 (P1 (RD) or P1 (BL)) of the setting menu Pa with the touch pen B, the pen ID "001" of the touch pen A associated with the attribute icon P1 does not match the pen ID "002" of the touch pen B touching the attribute icon P1. In this case, in step S21, the controller 210 sets (changes) the attribute of the touch pen B to the attribute of the attribute icon P1 of the setting menu Pa touched by the touch pen B. For example, as illustrated in FIG. 10, if the user B touches the attribute icon P1 (RD) included in the setting menu Pa with the touch pen B, the controller 210 changes the color attribute of the touch pen B to "yellow" to "red", as illustrated in FIG. 11. After step S21, the process proceeds to step S11. In the state illustrated in FIG. 11, the controller 210 performs control to display the attribute icon P1 (RD) of "red" changed from the attribute icon P1 (YL) selected so far for the touch pen B in the setting menu Pb. Thus, the controller 210 performs control to display the attribute icon P1 representing the current attribute of the touch pen 300 in the specific region AR. Thus, the user is capable of grasping the current attribute of the touch pen B by checking the attribute icon P1 in the setting menu Pb, for example. In the state illustrated in FIG. 11, controller 210 performs control to display the attribute icon P1 (YL) in the setting menu Pb without changing the attribute icon to the attribute icon P1 (RD) of "red" being the changed color. As a result, the user is capable of grasping the attribute set immediately before to the touch pen B. Further, in this case, the user is capable of easily restoring the attribute to the attribute "red" set immediately before by touching the attribute icon P1 (RD) in the setting menu Pb with the touch pen B changed in attribute to "red".

The controller 210 executes the display process according to the increase or decrease of the number of the touch pens 300 while repeating the above process.

Thus, upon detecting the input information input to the input surface by the touch pen 300, the display device 1 determines the input number N of the enabled (communicable) touch pens 300, based on the input information, and displays the attribute icon in which the attribute is settable for each of the touch pens 300, based on the input number N, in the specific region AR of the input surface. The display device 1 sets the attribute of the touch pen 300 if the attribute icon is selected. As a result, even if there are a plurality of touch pens 300 capable of simultaneously communicating, the attribute icon in which the attribute is settable is assigned for each of the touch pens 300 within the specific region AR without a need of increasing a ratio (area) of the specific region AR relative to a display screen of the touch display 100. Therefore, even if the number of touch pens increases, a drawing region in the display does not decrease. Thus, it is possible to perform the input operation on the display with a plurality of touch pens 300 without decreasing the drawing region of the display.

The present disclosure is not limited to the above-described embodiment. As another embodiment, the display processor 213 may display attribute icons of a plurality of attributes different in type from the attribute set to the touch pen 300 in the specific region AR. For example, in the state illustrated in FIG. 9, the display processor 213 displays a marker attribute icon P2 in the setting menu Pa and an eraser attribute icon P3 in the setting menu Pb, in the specific region AR. As a result, the users A and B are capable of easily changing the type of the touch pen 300 by the attribute icon displayed in the specific region AR.

As another embodiment, for example, if the touch pen A is in the enabled state (communicable state) and the input information corresponding to a new touch pen B is detected by the input detector 211, that is, if the touch pen B is enabled, the attribute setter 214 may automatically set, to the touch pen B, an attribute different from that of the touch pen A or may automatically set an attribute of an erasure function (eraser function), or may automatically set an attribute of a selection function.

Thus, the display processor 213 divides the specific region AR into a plurality of regions according to the input number N of the touch pens 300, and displays the attribute icon P1 in each of the divided regions for each of the touch pens 300. If a size (area) of the specific region AR is fixed, the display processor 213 increases the number of divided regions of the specific region AR without changing the size of the specific region AR even if the number of the touch pens 300 increases, and displays the attribute icon P1 corresponding to the touch pen 300 in each of the divided regions. Thus, the specific region AR is divided into a plurality of regions according to the number of the touch pens 300 while maintaining the entire area of the specific region AR.

In another embodiment, the display processor 213 may display the attribute icon for each of the touch pens 300 at locations separated from one another. For example, in the example illustrated in FIG. 9, the display processor 213 may display the setting menu Pa corresponding to the touch pen A on a left side of the display screen, and may display the setting menu Pb corresponding to the touch pen B on a right side of the display screen. In this case, the region AR1 and the region AR2 obtained by dividing the specific region A are separated from each other in the display screen. Thus, in the specific region AR, a plurality of divided regions may be arranged closely to one another at one place (one location) of the display screen, and the plurality of divided regions may be arranged dispersedly at a plurality of places (plurality of locations) of the display screen. The display processor 213 may change the display position of the corresponding setting menu according to the input position of the touch pen 300. For example, if a main input position (position coordinates) of the touch pen A is on the right side of the display screen, the display processor 213 displays the setting menu Pa on the right side of the display screen, if the main input position (position coordinates) of the touch pen B is on the left side of the display screen, the display processor 213 displays the setting menu Pb on the left side of the setting menu Pb. A total of each of the areas of the plurality of regions dispersedly arranged at the plurality of locations is the same as a total of each of the areas of the plurality of regions arranged at one place (area of the specific region AR).

Figure 20:
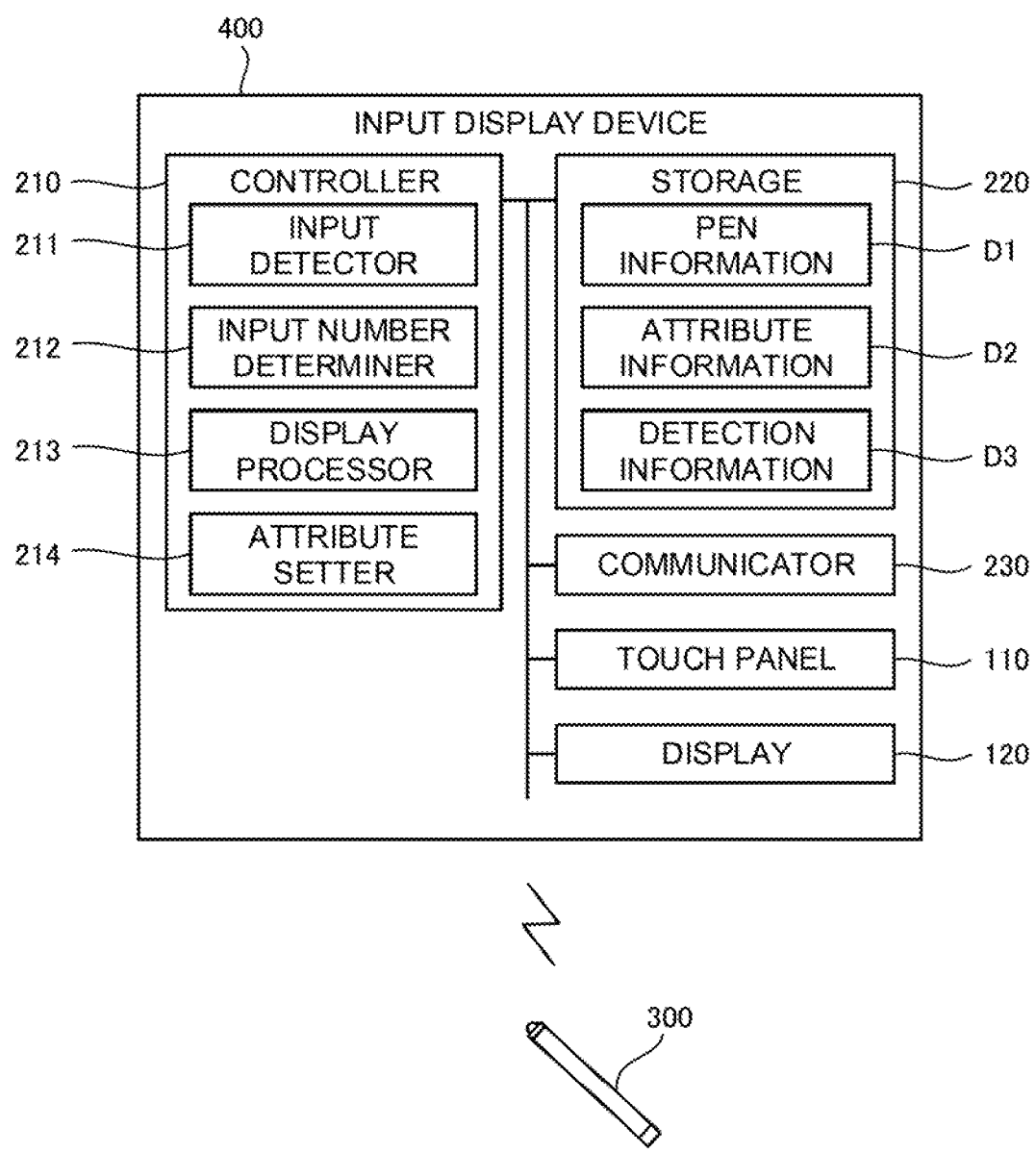
FIG. 20 is a block diagram illustrating another configuration of the display device according to the embodiment of the present disclosure.

As another embodiment, as illustrated in FIG. 20, the control device 200 and the touch display 100 may be formed as one body. The control device 200 and the touch display 100, which are formed as one body may be represented as an input display device 400 including the control device 200 and the touch display 100. The input display device 400 has functions of the control device 200 and the touch display 100 described above, and is connected to the touch pen 300 via a network (wireless communication or wired communication). The input display device 400 is an example of an information processing device according to the present disclosure.

It is noted that, in the display device 1 according to the present disclosure, within the scope of the invention described in claims, the embodiments described above may be freely combined, or the embodiments may be appropriately modified or some of the embodiments may be omitted.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

What is claimed is:

1. An information processing device comprising:
a memory that stores instructions; and
a processor that executes the instructions stored in the memory to:
detect input information input to an input surface by input devices,
determine, based on the input information detected, an input number indicating a number of the input devices of which an input operation on the input surface is enabled, and
display an attribute setting object in which an attribute of each of the input devices is settable, based on the input number determined, in a specific region of the input surface, wherein
in a case where a plurality of first attribute setting objects in which an attribute of a first input device is settable, are displayed in the specific region, upon detection of the input information corresponding to a second input device, the processor performs a display so that, in the specific region, at least one of the plurality of first attribute setting objects, which is switched to a second attribute setting object in which an attribute of the second input device is settable, is assigned to the second input device.

2. The information processing device according to claim 1, wherein the processor displays the first attribute setting object and the second attribute setting object in an aligned manner, in the specific region.

3. The information processing device according to claim 2, wherein the processor divides the specific region into a region in which the first attribute setting object is arranged and a region in which the second attribute setting object is arranged.

4. The information processing device according to claim 3, wherein a total number of the attribute setting objects displayed in the specific region before the specific region is divided is the same as a total number of the attribute setting objects displayed in the specific region after the specific region is divided.

5. The information processing device according to claim 1,
wherein the processor sets the attribute of the input devices, based on the attribute setting object selected by the input devices.

6. The information processing device according to claim 5, wherein if upon selection, by the second input device different from the first input device corresponding to the first attribute setting object, of the first attribute setting object displayed in the specific region the processor sets the attribute of the second input device, based on the first attribute setting object selected.

7. The information processing device according to claim 5, wherein in a case where the first attribute setting object corresponding to the first input device is displayed in the specific region and the second attribute setting object corresponding to the second input device is not displayed in the specific region, upon detection of the input information corresponding to the second input device the processor sets the attribute different from the attribute corresponding to the first input device, to the second input device.

8. The information processing device according to claim 1, wherein the processor displays a plurality of the attribute setting objects with respectively associated attributes being different from one another in the specific region.

9. The information processing device according to claim 1, wherein the attribute includes at least one of a color of information displayed on the input surface by each of the input devices, a thickness of the information, and an erasure function to erase the information displayed on the input surface.

10. An information processing method for causing one or more processors to execute following steps, the method comprising:
    detecting an input of input information input to an input surface by input devices;
    determining, based on the input information detected in the detecting, an input number indicating a number of the input devices of which an input operation on the input surface is enabled; and
    displaying an attribute setting object in which an attribute of each of the input devices is settable, based on the input number determined in the determining, in a specific region of the input surface, wherein
    in a case where a plurality of first attribute setting objects in which an attribute of a first input device is settable, are displayed in the specific region, upon detection of the input information corresponding to a second input device, a display is performed so that, in the specific region, at least one of the plurality of first attribute setting objects, which is switched to a second attribute setting object in which an attribute of the second input device is settable, is assigned to the second input device.

11. A non-transitory computer-readable recording medium storing an information processing program for causing one or more processors to execute:
    detecting an input of input information input to an input surface by input devices;
    determining, based on the input information detected in the detecting, an input number indicating a number of the input devices of which an input operation on the input surface is enabled; and
    displaying an attribute setting object in which an attribute of each of the input devices is settable, based on the input number determined in the determining, in a specific region of the input surface, wherein
    in a case where a plurality of first attribute setting objects in which an attribute of a first input device is settable, are displayed in the specific region, upon detection of the input information corresponding to a second input device, a display is performed so that, in the specific region, at least one of the plurality of first attribute setting objects, which is switched to a second attribute setting object in which an attribute of the second input device is settable, is assigned to the second input device.

* * * * *